(12) United States Patent
Sharma et al.

(10) Patent No.: US 9,888,360 B2
(45) Date of Patent: Feb. 6, 2018

(54) METHODS TO OPTIMIZE AND STREAMLINE AP PLACEMENT ON FLOOR PLAN

(71) Applicant: QUALCOMM Incorporated, San Diego, CA (US)

(72) Inventors: Abhinav Sharma, Santa Clara, CA (US); Sunil Patel, Fremont, CA (US); Murthy S. Vempati, San Jose, CA (US); Saumitra Mohan Das, Santa Clara, CA (US); Chandrakant Mehta, Santa Clara, CA (US); Rupali T. Desai, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 13/763,257

(22) Filed: Feb. 8, 2013

(65) Prior Publication Data
US 2014/0120945 A1    May 1, 2014

Related U.S. Application Data

(60) Provisional application No. 61/721,435, filed on Nov. 1, 2012.

(51) Int. Cl.
*H04W 40/00* (2009.01)
*H04W 4/04* (2009.01)
(Continued)

(52) U.S. Cl.
CPC ............. *H04W 4/04* (2013.01); *G01S 5/0236* (2013.01); *G01S 5/0242* (2013.01);
(Continued)

(58) Field of Classification Search
None
See application file for complete search history.

(56) References Cited

U.S. PATENT DOCUMENTS

2004/0233857 A1 * 11/2004 Wimmer ................. H04L 41/00
370/254
2005/0059406 A1    3/2005 Thomson et al.
(Continued)

FOREIGN PATENT DOCUMENTS

CN    101953197 A    1/2011
CN    102474843 A    5/2012
(Continued)

OTHER PUBLICATIONS

International Search Report and Written Opinion—PCT/US2013/064143—ISAEPO—dated Jan. 29, 2014.

*Primary Examiner* — Vladimir Magloire
*Assistant Examiner* — Jaime Holliday
(74) *Attorney, Agent, or Firm* — Kilpatrick Townsend & Stockton, LLP

(57) ABSTRACT

Embodiments may automatically place access points (APs) on floor plans by incorporating a number of conventions for identifying types and locations of APs. These conventions may include the name of APs, MAC addresses, lat/lon information, and feature analysis or image recognition techniques for matching visual cues if the AP locations are marked on images. Some embodiment may conduct several other operations to optimize placement of APs. These optimization operations may reduce the number of steps needed to place APs on floor plans, and/or may reduce extraneous and superfluous information from the floor plans that may clutter the annotated floor plan map.

34 Claims, 7 Drawing Sheets

(51) Int. Cl.
  *G01S 5/02*  (2010.01)
  *H04W 16/20*  (2009.01)
  *H04W 16/18*  (2009.01)
  *H04W 24/02*  (2009.01)
  *H04W 76/02*  (2009.01)
  *H04W 24/00*  (2009.01)
(52) U.S. Cl.
  CPC ............ *H04W 4/043* (2013.01); *H04W 16/18* (2013.01); *H04W 16/20* (2013.01); *H04W 24/00* (2013.01); *H04W 24/02* (2013.01); *H04W 76/02* (2013.01)

(56) References Cited

U.S. PATENT DOCUMENTS

| | | | |
|---|---|---|---|
| 2005/0245252 A1 | 11/2005 | Kappes et al. | |
| 2006/0073832 A1* | 4/2006 | Pfister | H04L 41/12 455/446 |
| 2007/0054670 A1* | 3/2007 | Kalika | H04L 12/2456 455/446 |
| 2007/0082677 A1 | 4/2007 | Donald Hart et al. | |
| 2007/0133487 A1* | 6/2007 | Wang | G01S 5/0252 370/338 |
| 2008/0176583 A1* | 7/2008 | Brachet et al. | 455/456.3 |
| 2008/0182584 A1* | 7/2008 | Le | 455/446 |
| 2010/0008337 A1* | 1/2010 | Bajko | H04W 64/00 370/338 |
| 2010/0118830 A1* | 5/2010 | Stephenson et al. | 370/331 |
| 2010/0331009 A1 | 12/2010 | Krishnamurthy et al. | |
| 2011/0018732 A1 | 1/2011 | Cho et al. | |
| 2011/0237197 A1 | 9/2011 | Zumsteg et al. | |
| 2011/0268060 A1 | 11/2011 | Heidari et al. | |
| 2011/0282901 A1 | 11/2011 | Marks et al. | |
| 2012/0129559 A1 | 5/2012 | Pochop, Jr. | 455/507 |
| 2014/0036788 A1* | 2/2014 | Ganu et al. | 370/329 |

FOREIGN PATENT DOCUMENTS

| | | |
|---|---|---|
| CN | 102480744 A | 5/2012 |
| JP | 2010157853 A | 7/2010 |
| JP | 2012105154 A | 5/2012 |
| JP | 2013505444 A | 2/2013 |

* cited by examiner

METHODS TO OPTIMIZE AND STREAMLINE AP PLACEMENT ON FLOOR PLAN

CROSS REFERENCE TO RELATED APPLICATIONS

This application claims the benefit of U.S. Provisional Patent Application No. 61/721,435, filed Nov. 1, 2012, and titled "METHODS TO OPTIMIZE AND STREAMLINE AP PLACEMENT ON FLOOR PLAN," the disclosure of which is hereby incorporated herein by reference in its entirety and for all purposes.

BACKGROUND

Indoor location positioning systems are becoming more commonplace. Technologies are developing that more efficiently utilize WiFi sources for indoor use. These indoor positioning techniques may be more efficient than techniques relying on global navigation satellite systems (GNSS) in some cases, particularly when GNSS signals are weak and hampered by physical obstructions, e.g. walls in office buildings, residences, stores, etc. Because of the increasing prevalence of indoor techniques and their utilization of WiFi access points (APs), it becomes ever more desirable to reliably, accurately, and efficiently map the locations of these APs in indoor positioning systems.

SUMMARY

These problems and others may be solved according to embodiments of the present invention, described herein.

Embodiments may automatically place access points (APs) on floor plans by incorporating a plurality of conventions for identifying types and locations of APs. These conventions may include the name of APs, MAC addresses, latitude/longitude (lat/lon) information, and feature analysis or image recognition techniques for matching visual cues if the AP locations are marked on images. In some embodiments, the plurality of APs are automatically placed using the plurality of conventions. For example, a first AP of the plurality of APs may be automatically placed on the floor plan map using a first convention of the plurality of conventions, and a second AP of the plurality of APs may be automatically placed on the floor plan map using a second convention of the plurality of conventions.

Some embodiments may conduct several other operations to optimize placement of APs. These optimization operations may reduce the number of steps needed to place APs on floor plans, and/or may reduce extraneous and superfluous information from the floor plans that may clutter the annotated floor plan map. For example, present techniques have the ability to group APs based on at least one common attribute (e.g. MAC prefix, elevation, lat/lon proximity, etc.). The grouping may allow for additional operations, such as a group move, updating all APs in the group in the same way, mass deletion, etc.

Some embodiments may identify APs that are redundant with respect to positioning performance. APs may be identified based on their locations and signal strength, and if other APs are nearby and/or offer stronger performance, some APs may be identified as offering redundant positioning performance. In some embodiments, these APs may be removed or ignored from consideration if they offer little to no benefit. Thus, present techniques may reduce the number of APs from consideration or determine a minimal number of APs such that full coverage of the floor plan is still attained.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
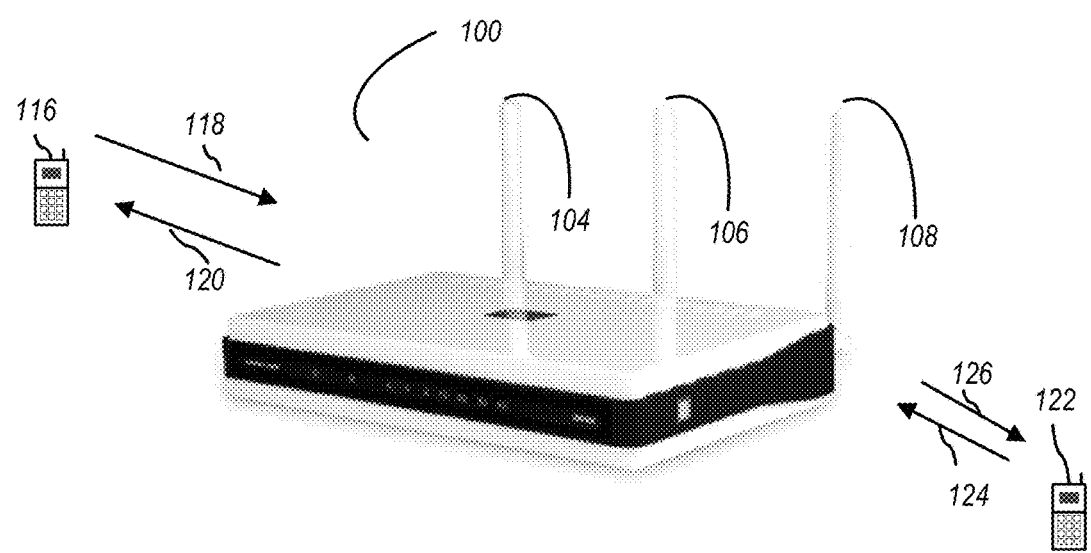
FIG. 1 is an example multiple access wireless communication system according to some embodiments.

The word "exemplary" is used herein to mean "serving as an example, instance, or illustration." Any embodiment or design described herein as "exemplary" is not necessarily to be construed as preferred or advantageous over other embodiments or designs.

As used herein, an "access point" may refer to any device capable of and/or configured to route, connect, share, and/or otherwise provide a network connection to one or more other devices. An access point may include one or more wired and/or wireless interfaces, such as one or more Ethernet interfaces and/or one or more IEEE 802.11 interfaces, respectively, via which such a connection may be provided. For example, an access point, such as a wireless router, may include one or more Ethernet ports to connect to a local modem or other network components (e.g., switches, gateways, etc.) and/or to connect to one or more other devices to which network access is to be provided, as well as one or more antennas and/or wireless networking cards to broadcast, transmit, and/or otherwise provide one or more wireless signals to facilitate connectivity with one or more other devices.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Some embodiments include methods for placing access points (APs) on a floor plan map automatically and in an optimized manner. Indoor positioning techniques may rely on determining position of a user or mobile device relative to known locations of access points (APs). Examples of APs may be a wireless receiver connected to the Internet such as a wireless router, a local area network (LAN) router, or a GPS device configured to broadcast GPS coordinates. APs may be placed physically in a building in any location, such as on the ceiling in the middle of a conference room, near a stairwell, in the corner of a room, etc. Current techniques for placing APs on floor plans generally involve a tedious manual procedure, where an analyst may need to place an approximate location of each AP manually onto a digital floor plan.

Several problems may exacerbate the manual procedure of placing the APs on floor plans. For example, depending on the size of a floor and/or a building, there may be dozens, if not hundreds, of APs. Also, information sufficient to identify the type and location of each AP may vary, making a more manual input prone to error as well as be more time consuming. For example, office managers may provide the location of APs in latitude/longitude (lat/lon) or not, the APs may be expressed in a data file with different naming conventions, the MAC addresses for the APs may be provided or not, and other times just a pictorial representation of the AP locations may be provided. Also, locations may change frequently after floor plan redesigns or remodels. Thus, efficiently identifying placements of APs on a floor plan may be desired in order to efficiently map out floor plans for indoor positioning.

Embodiments herein may solve these and other related problems. Embodiments may automatically place APs on floor plans by incorporating a number of conventions for identifying types and locations of APs. These conventions may include the name of APs, MAC addresses, lat/lon information, and feature analysis or image recognition techniques for matching visual cues if the AP locations are marked on images.

Additionally, some embodiments may conduct several other operations to optimize placement of APs. These optimization operations may reduce the number of steps needed to place APs on floor plans, and/or may reduce extraneous and superfluous information from the floor plans that may clutter the annotated floor plan map. For example, present techniques have the ability to group APs based on at least one common attribute (e.g. MAC prefix, elevation, lat/lon proximity, etc.). The grouping may allow for additional operations, such as a group move, updating all APs in the group in the same way, mass deletion, etc.

In another example, embodiments may identify APs that are redundant with respect to positioning performance. APs may be identified based on their locations and signal strength, and if other APs are nearby and/or offer stronger performance, some APs may be identified as offering redundant positioning performance. In some embodiments, these APs may be removed or ignored from consideration if they offer little to no benefit. Thus, present techniques may reduce the number of APs from consideration or determine a minimal number of APs such that full coverage of the floor plan is still attained.

Referring to FIG. 1, an example multiple-access access point utilized in some embodiments is presented. Access point (AP) 100 includes multiple antennas, including 104, 106, and 108. More or fewer antennas may be utilized in other embodiments. Access terminal 116 (AT) may be in communication with AP 100 via antenna 104, where antenna 104 may transmit signals to access terminal 116 over forward link 120 and may receive signals from access terminal 116 over reverse link 118. Access terminal 122 is in communication with AP 100 via antenna 108, where antenna 108 may transmit signals to access terminal 122 over forward link 126 and may receive signals from access terminal 122 over reverse link 124. In a Frequency Division Duplex (FDD) system, communication links 118, 120, 124 and 126 may use different frequencies for communication. For example, forward link 120 may use a different frequency then that used by reverse link 118. In some embodiments, antennas 104, 106, and 108 may each be in communication with both ATs 116 and 122. AT 116 may be in communication with AP 100 in a first frequency, while AT 122 may be in communication with AP 100 in a second frequency, for example. In some embodiments, multiple antennas, e.g. antennas 104 and 106, may be in communication with just a single mobile device, e.g. AT 116. Multiple antennas may be used to transmit the same type of data but arranged in different sequences to improve diversity gain.

Each group of antennas and/or the area in which they are designed to communicate is often referred to as a sector of the access point. In some embodiments, antenna groups each are designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
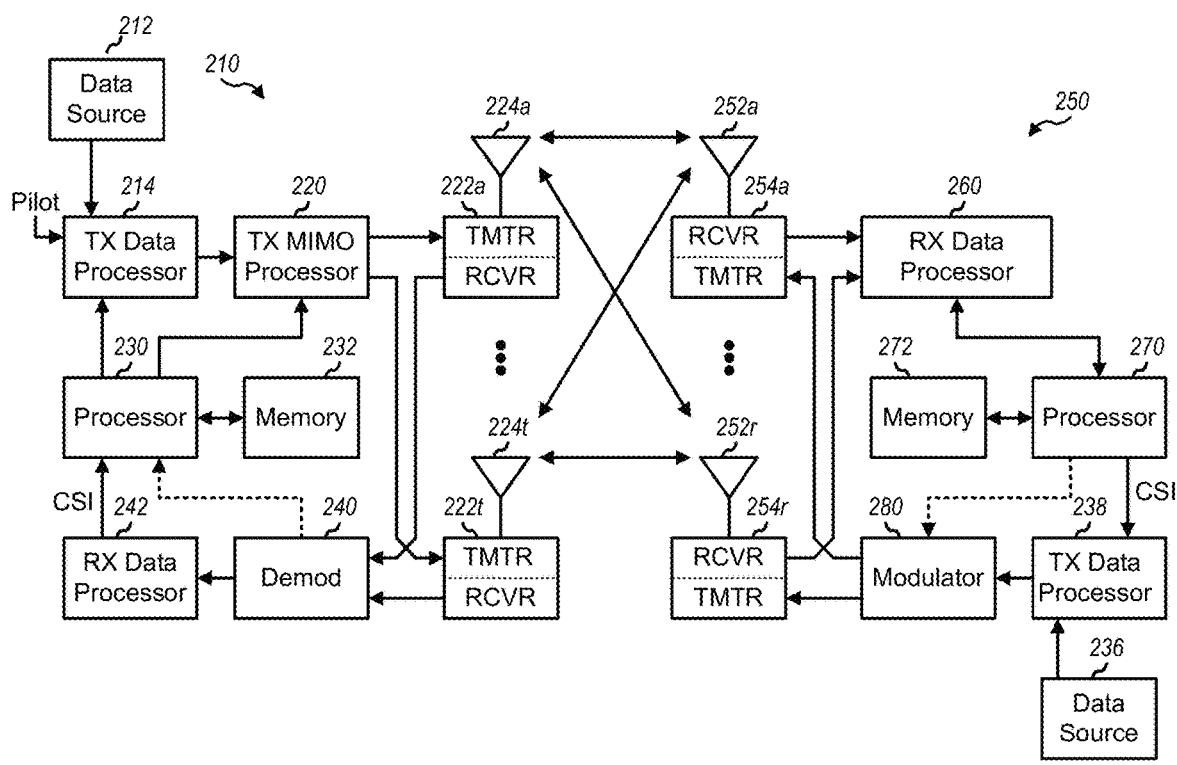
FIG. 2 is an example wireless communications interface including a transmitter system and a receiver system according to some embodiments.

FIG. 2 is a block diagram of an embodiment of a transmitter system 210 of an access point and a receiver system 250 of an access terminal in a multiple-input and multiple-output (MIMO) system 200 according to some embodiments. At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency division multiplexing (OFDM) techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t, where NT is a positive integer associated with transmitters described in FIG. 2. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r, where NR is a positive integer associated with receivers described in FIG. 2. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. Memory 272 stores the various pre-coding matrices that are used by processor 270.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message. Processor 230 obtains the pre-coding matrices from memory 232, which stores various pre-coding matrices. Memory 232 may also contain other types of data, such as information databases and locally and globally unique attributes of multiple base stations.

The techniques described herein may also be practiced with APs containing just a single receiving antenna and a single transmitting antenna (SISO), a single receiving antenna and multiple transmitting antennas (SIMO), and multiple transmitting antennas and a single receiving antenna (MISO) with configurations similar to those described in FIGS. 1 and 2. Embodiments are not so limited.

Figure 3A:
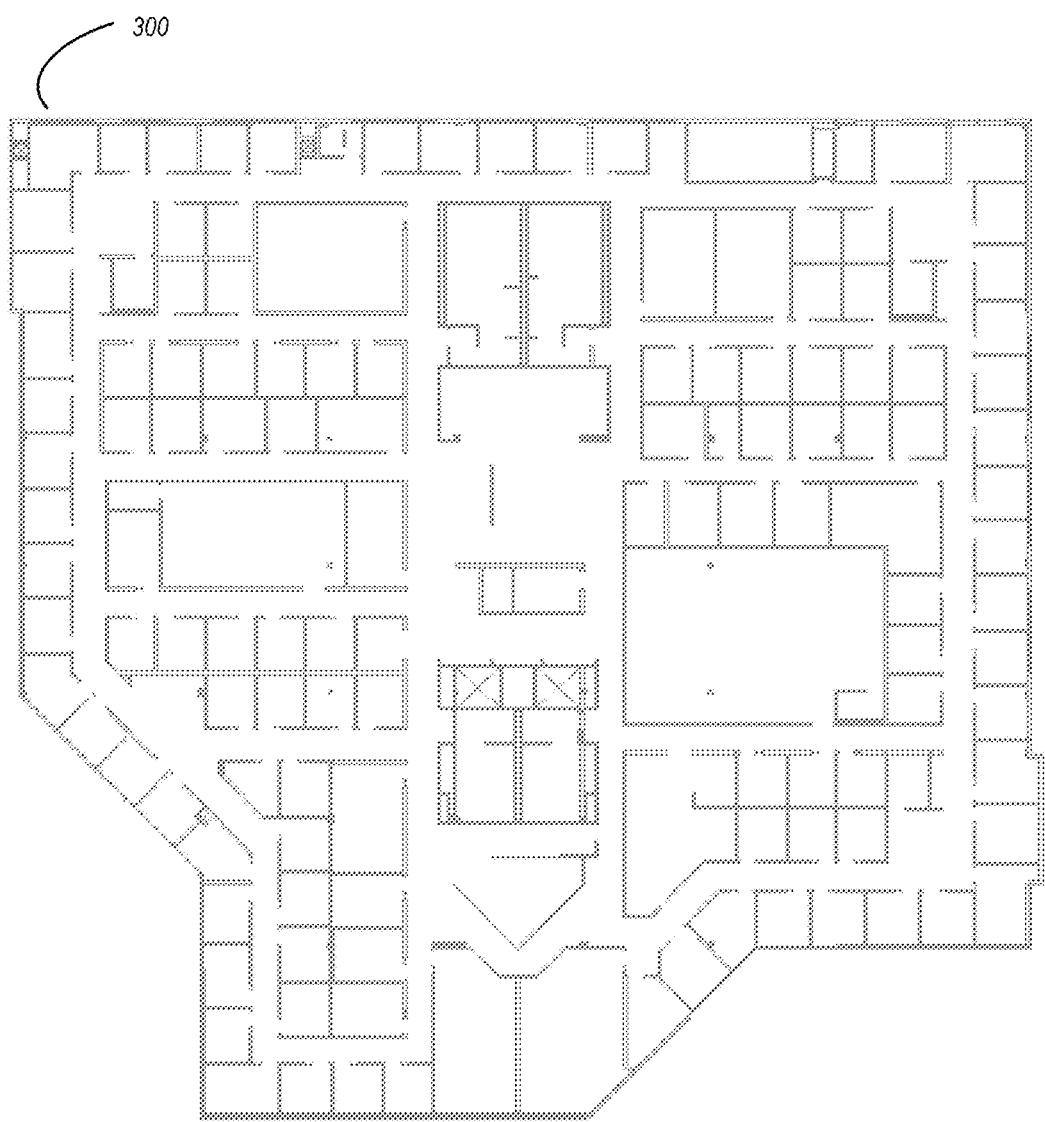
FIGS. 3A and 3B are example wireless communications environments of a user equipment (UE) utilizing multiple access points (APs) according to some embodiments.
Figure 3B:
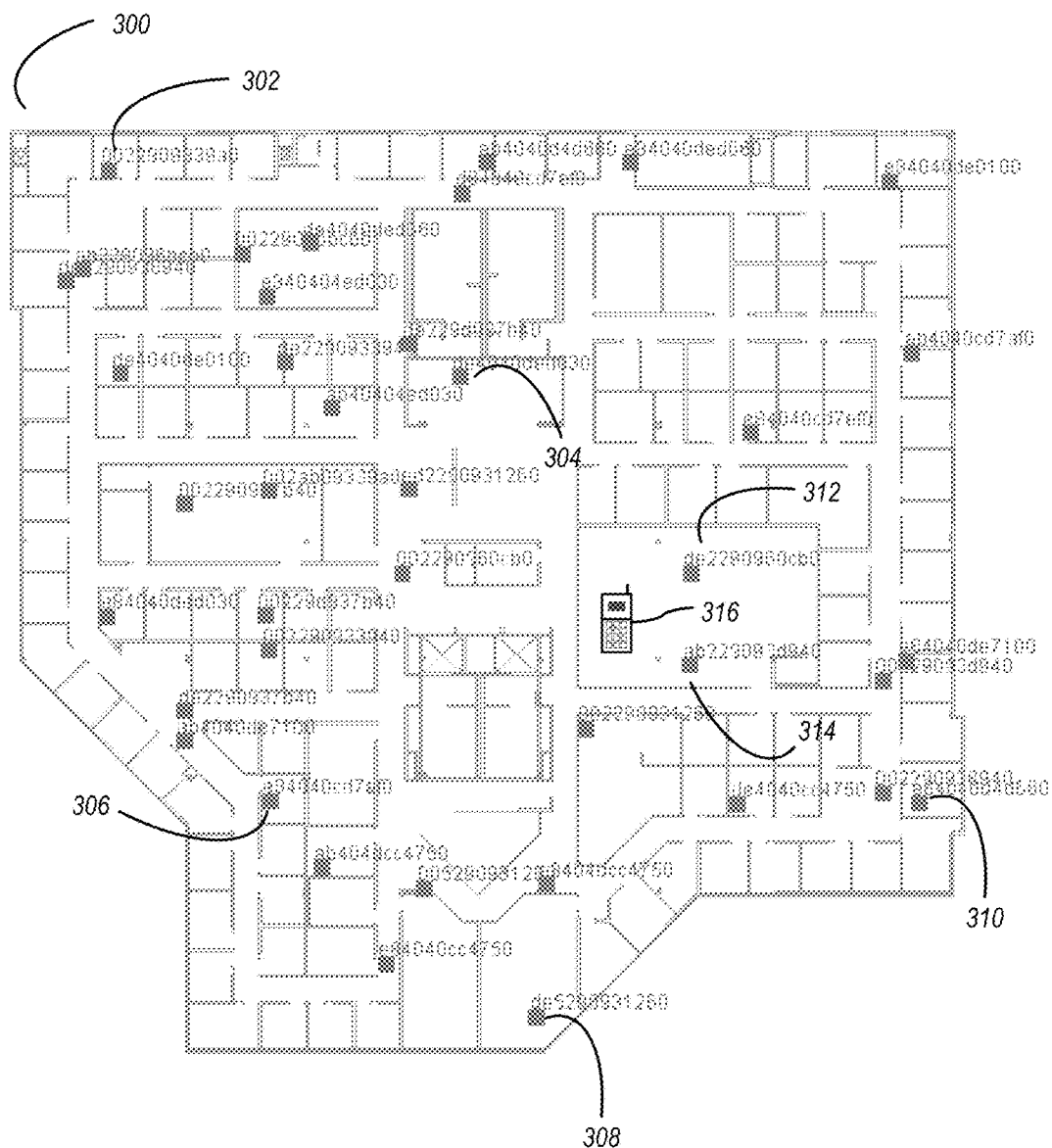

Referring to FIGS. 3A and 3B, exemplary floor plan map 300 may illustrate an example placement of numerous APs onto a single floor plan. Floor plan map 300 in FIG. 3A may represent a large office building floor or a mall plan floor. Given the many rooms, conventional access to WiFi may require dozens, if not hundreds of APs being placed throughout the floor plan map 300.

Referring to FIG. 3B, floor plan map 300 may require many APs to be placed, as shown, in order to provide comprehensive WiFi coverage throughout the floor 300. The locations may be recorded on floor plan map 300, and may represent an exact or near approximate position of each AP. Example APs may include APs 302, 304, 306, 308, 310, 312, and 314 as shown. Thus a user equipment (UE) 316 operating within the wireless network environment of access points (APs) of floor plan map 300 may be able to receive wireless coverage throughout the floor. A UE 316 may refer to any apparatus used and/or operated by a user or consumer, such as a mobile device, cell phone, electronic tablet, touch screen device, radio, GPS device, etc. A UE or mobile station (e.g. a cell phone) 316 may attempt to determine its global position or access global positioning information for other purposes, utilizing the APs in the wireless environment. A UE may also be able to access the Internet or wireless local area networks (WLANs) through the APs. The APs, including APs 302, 304, 306, 308, 310, 312, and 314 and others as shown, may be configured to transmit and receive messages from multiple mobile devices, and may be consistent with those described in FIGS. 1 and 2.

Each AP may have location information to uniquely identify each AP and its location. For example, the APs on floor plan 300 show a twelve-hexadecimal character serial number to unambiguously identify each AP. A database containing a list of all of the serial numbers may then reference each AP to a location, defined in latitude/longitude coordinates, for example. In other examples, the location of each AP may not be as specific, and descriptions of APs provided by venue owners may contain only a listing of what floor and building each AP is located on. In other examples, only just the floor plan 300 may be provided with approximate locations of APs as shown and no unique identifying information, where an analyst may then be required to determine a quantifiable location of the APs for suitable use for indoor location positioning. In yet other examples, AP locations may contain only room number descriptions, or merely a MAC address mapping. In other cases, some APs may be described by a short abbreviation of their locations, e.g. "Room_212_AP_1," or "AP_2_NW," etc. Other forms of descriptions of AP locations may certainly be possible, and embodiments may be configured to process any and all of them.

In other cases, the AP locations may be wholly inaccurate, because the information may be old and/or placements may have changed after their initial locations were recorded. One can imagine, therefore, that a manual process of receiving such spotty and unsystematic information can be quite error-prone, as well as extremely time consuming. To record the AP locations and other relevant information of just this floor plan map 300 alone may involve recording dozens of AP locations, using whatever information is provided, and performing tedious calculations or operations to obtain other information where needed.

Embodiments therefore may automatically place APs on floor plan maps based on a number of conventions provided by entities supplying the AP location information, including venue owners of the buildings to which the floor plans pertain. Embodiments may also incorporate language parsing techniques to discern certain metadata in order to intelligently place APs. For example, regular expression matching techniques using suitable scripting languages, e.g. Perl, Python, Tcl, etc., may be used to parse descriptive information out of provided names or labels associated with the floor plan maps. Additionally, a grammar for how room numbers may be arranged for any particular floor plan map may be derived from various sources, including any information associated with the APs or the floor plan maps. Room number grammar may include how many digits are used to list room numbers, and whether an alphabet is included in describing the rooms, for example. Moreover, other parsing variants may be used, such as tokenization, top-down parsing, and bottom-up parsing. Certain key characters, such as "_" and " " may be focused on, along with other human input, to help determine what specific techniques may be most suitable for the floor plan map information available at present. For example, an AP with labeled as "API_room_212" may be placed in a room with room number "212" using examples techniques described herein, or others that are apparent to persons having ordinary skill in the art. In some embodiments, input data files with mappings of AP names to MAC addresses may be parsed to obtain the MAC address of each AP, and the location may be inferred at least based in part by the MAC address information.

In some embodiments, a mapping of the AP position may be obtained from absolute positioning information (e.g. latitude/longitude) by coordinating the absolute positioning information of the AP with the absolute positioning information of the floor plan map. The coordinates may be provided with the APs listed in floor plan maps, or may be estimated based on standard geo-referencing techniques, known in the art.

In some embodiments, APs that are already visually marked on floor plan map images may be automatically placed in a computer system by performing feature analysis or other image recognition techniques. The techniques may be based on vector extraction on raster images as well as extraction of various AP location features, e.g. whether APs are near walls, near stairwells, etc. One example of vector extraction may involve image processing to determine which sequence of pixels can constitute certain room properties, e.g. line segments, arcs, etc., and whether multiple such sequences can be merged in the same vector line segment (e.g. for thick lines). Embodiments may also combine any of these techniques together to verify or improve automatic placements.

Other auto-population techniques according to some embodiments may be based on MAC addresses of the APs and their contiguity to other APs with similar MAC address. For example, in some embodiments, MAC addresses that differ by one in the last digit may be determined to belong to the same physical WiFi AP, and thus it may be determined that these MAC addresses inherit all the properties of the original AP. Other factors for auto-population may include the positions of the APs on the floor plan maps, the frequency of the APs, the MAC address prefixes, WLAN chip model serial numbers and vendor/manufacturer information, and the like. In another example, once the information about the APs on a floor plan map are obtained (e.g. using vector extraction and treating the group of APs as a vector), the locations of the APs with respect to the floor plan map may be known (e.g. in lat/lon coordinates, or a relative {x,y} formulation. The absolute locations of the APs can be known then, either by obtaining coordinates in an absolute scale, or by combining the locations in a relative scale with an absolute location known for the floor plan map. Thereafter, this group of APs may be grouped as described in aforementioned techniques above.

Embodiments may also provide for group selecting multiple APs in or on floor plan maps for ease of placement or to modify the group's metadata information. Group selecting may be based on several criteria, including but not limited to: MAC prefix, elevation, proximity in relation to other APs, AP Model information (e.g. round trip time (RTT) TCF, transmitter power, antenna type, etc.), different bounding polygonal structures for grouping, and other physical characteristics of the APs such as bandwidth, number of ports, number of antennas, etc. Group selecting may be beneficial for a number of reasons, including, for example, ease of placement for APs with common attributes, making changes en masse when warranted, e.g. data for a whole floor plan is old and needs to be updated every six months, etc.

Exemplary group operations may include performing a group move of the APs on the floor plan map, updating parameters of all APs in the group, and group removal or deletion off of the floor plan map. These are merely examples, and others may be apparent to persons having ordinary skill in the art.

Additionally, some embodiments may optimize the placement of APs by identifying and marking APs that are redundant with respect to positioning performance provided. For example, some APs may be very close to each other, wherein one of the APs provides much stronger coverage than all the others. Thus, the one or more APs providing weaker coverage may be considered redundant, and it may not be necessary, therefore, to identify and record the information of these APs for positioning performance purposes.

For example, to facilitate such optimization, some embodiments may cluster APs into groups based on proximity to each other. The AP clusters may then be ranked based on their impact on location performance. For example, one can calculate the horizontal dilution of precision (HDOP) under some conservative signal strength threshold such as −70. If the HDOP does not degrade with thinning of the clusters (removal of AP in a cluster) then the AP can be safely removed from the assistance database without adversely affecting coverage, or only provide it if the mobile requests the full database. Clustering groups of APs close to each other based on distance and the HDOP analysis allows for a reliable removal of APs from individual clusters while maintaining position performance. In some embodiments, in addition to or alternative to removing the clusters, recordation and assistance data generation for those clusters may be skipped with least impact on performance to reduce assistance data necessary to be held in a database.

Figure 4A:
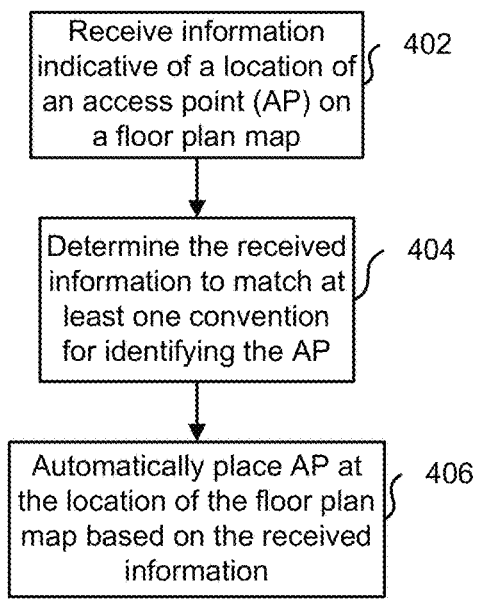
FIGS. 4A and 4B are example flowcharts according to some embodiments.

Referring to FIG. 4A, exemplary flowchart 400 may illustrate some method steps according to some embodiments. For example, at block 402, some embodiments may receive information indicative of a location of an AP on a floor plan map. At block 404, embodiments may determine that the received information matches at least one convention for identifying the AP and its location. The at least one convention may be any of the location identification conventions described in the above disclosures, including descriptions at FIGS. 3A and 3B. At block 406, embodiments may automatically place the AP at the location of the floor plan map based on the received information.

Figure 4B:
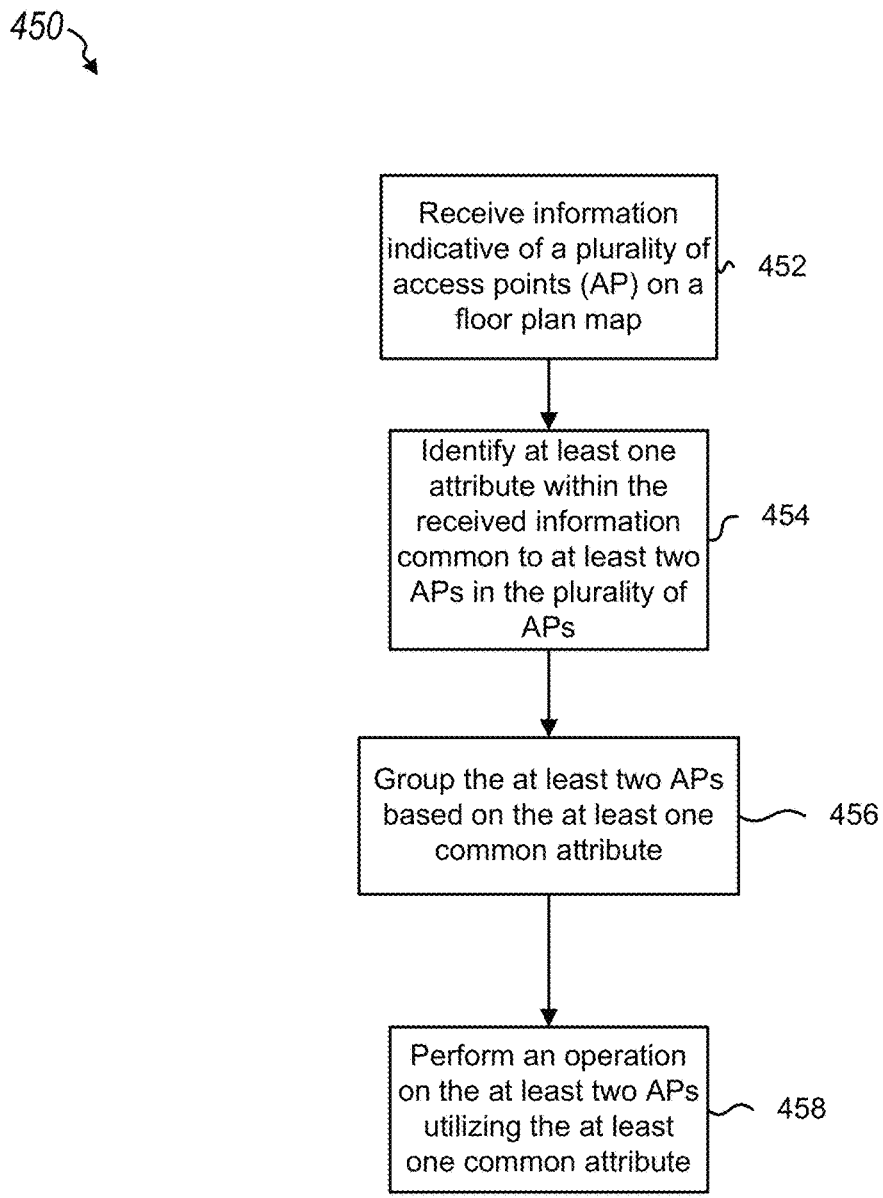

Referring to FIG. 4B, exemplary flowchart 450 may illustrate other method steps according to some embodiments. At block 452, embodiments may receive information indicative of a plurality of APs on a floor plan map. At block 454, embodiments may then identify at least one attribute within the received information common to at least two APs in the plurality of APs. At block 456, embodiments may then group the at least two APs based on the at least one common attribute. At block 458, some embodiments may perform an operation on the at least two APs utilizing the at least one common attribute. The common attributes referred to herein may be consistent with any of the attributes associated with the APs described in any of the above disclosures. Example operations may include group moving, group updating, and group removal of APs. Example types of group updating may include providing a common tag or label for each AP in the group, updating the names of the APs, updating a type of manufacturer or model of the APs, etc. Additionally, operations may include determining what groups of APs are redundant and/or provide minimal additional coverage to wireless performance. The groups may then be ranked to determine which groups may be removed, or simply moved, to optimize AP placement.

In one example scenario to illustrate a use for the aforementioned features, suppose at least one characteristic of an AP owned by a particular vendor has changed. For example, RTT processing delay has been observed to be changed elsewhere for at least one AP of a particular vendor. Then, all APs of that vendor can be grouped together and the processing delay value for that group can be changed together. Alternatively or in addition to, one could also group select the most useful APs which ensure some threshold of HDOP performance all over the map. Then the selected group could be copied into some other system for prioritization in assistance data encoding, for example.

Many embodiments may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 5:
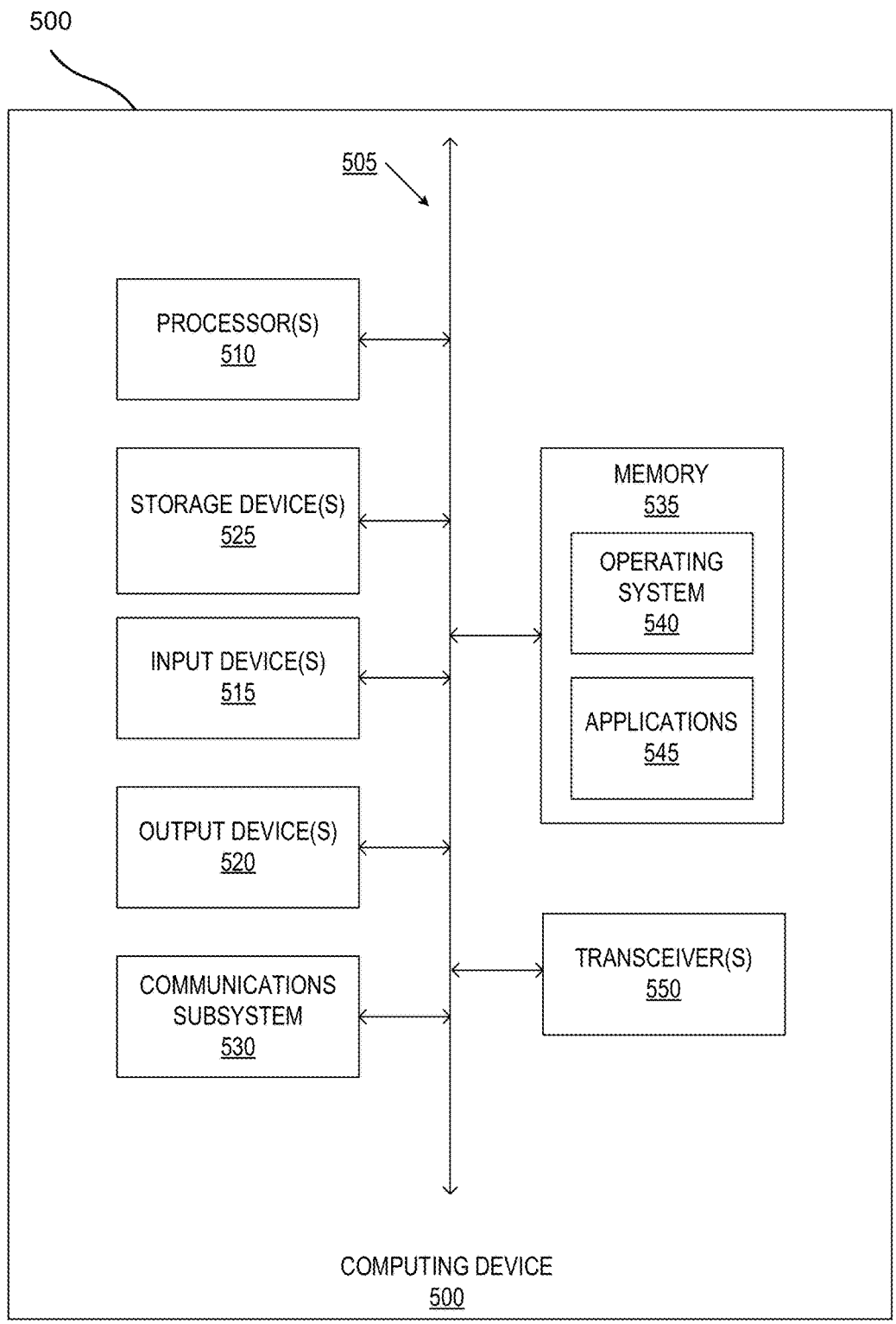
FIG. 5 is an example computer system according to some embodiments.

Having described multiple aspects of automatically placing APs on a floor plan map and optimizing such placement, an example of a computing system in which various aspects of the disclosure may be implemented will now be described with respect to FIG. 5. According to one or more aspects, a computer system as illustrated in FIG. 5 may be incorporated as part of a computing device, which may implement, perform, and/or execute any and/or all of the features, methods, and/or method steps described herein. For example, computer system 500 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In some embodiments, the system 500 is configured to implement any of the methods described above. FIG. 5 provides a schematic illustration of one embodiment of a computer system 500 that can perform the methods provided by various other embodiments, as described herein, and/or can function as the host computer system, a remote kiosk/terminal, a point-of-sale device, a mobile device, a set-top box, and/or a computer system. FIG. 5 is meant only to provide a generalized illustration of various components, any and/or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a camera, wireless receivers, wireless sensors, a mouse, a keyboard and/or the like; and one or more output devices 520, which can include without limitation a display unit, a printer and/or the like. In some embodiments, the one or more processor 510 may be configured to perform a subset or all of the functions described above with respect to FIGS. 4A and 4B. The processor 510 may comprise a general processor and/or and application processor, for example. In some embodiments, the processor is integrated into an element that processes visual tracking device inputs and wireless sensor inputs.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above. In some embodiments communications subsystem 530 may interface with transceiver(s) 550 configured to transmit and receive signals from access points or mobile devices. Some embodiments may include a separate receiver or receivers, and a separate transmitter or transmitters.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 5, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein, for example methods described with respect to FIG. 5.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communications subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510. Memory 535 may contain at least one database according to any of the databases and methods described herein. Memory 535 may thus store any of the values discussed in any of the present disclosures, including FIGS. 1, 2, 3A, 3B, 4A, 4B and related descriptions.

The methods described in FIGS. 4A and 4B may be implemented by various blocks in FIG. 5. For example, processor 510 may be configured to perform any of the functions of blocks in diagrams 400 and 450. Storage device 525 may be configured to store an intermediate result, such as a globally unique attribute or locally unique attribute discussed within any of blocks mentioned herein. Storage device 525 may also contain a database consistent with any of the present disclosures. The memory 535 may similarly be configured to record signals, representation of signals, or database values necessary to perform any of the functions described in any of the blocks mentioned herein. Results that may need to be stored in a temporary or volatile memory, such as RAM, may also be included in memory 535, and may include any intermediate result similar to what may be stored in storage device 525. Input device 515 may be configured to receive wireless signals from satellites and/or base stations according to the present disclosures described herein. Output device 520 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for placing access points (APs) on a floor plan map, the method comprising:
   receiving a floor plan map and location information for a plurality of APs, wherein the floor plan map corresponds to a venue, and the plurality of APs are placed physically at the venue;
   accessing a plurality of conventions associated with the plurality of APs, wherein a first one of the plurality of conventions indicates identity information for each AP of the plurality of APs and a second one of the plurality of conventions indicates the location information for each AP of the plurality of APs, wherein the identity information comprises at least one of signal strength, unique numerical identifier, serial number, media access control ("MAC") address, name, frequency information, MAC address prefix, chip model, vendor information, manufacturer information, model information, bandwidth information, number of ports, or number of antennas;
   determining a first current location in the venue of a first AP of the plurality of APs based on location information for the first AP and identity information for the first AP, the identity information for the first AP based on a first convention of the plurality of conventions and the location information for the first AP based on a second convention of the plurality of conventions different from the first convention;
   determining a second current location in the venue of a second AP of the plurality of APs based on location information for the second AP and identity information for the second AP, the identity information for the second AP based on the first convention and the location information for the second AP based on the second convention;
   automatically placing a representation of the first AP on the floor plan map at the first current location; and
   automatically placing a representation of the second AP on the floor plan map at the second current location.

2. The method of claim 1, wherein one of the plurality of conventions comprises latitude/longitude coordinates and receiving location information for the plurality of APs further comprises:
   receiving a latitude/longitude coordinate of at least one of the plurality of APs.

3. The method of claim 1, wherein one of the plurality of conventions comprises a visual map of the floor plan with a visual representation of an AP location and receiving location information for the plurality of APs further comprises:
   receiving a visual map comprising at least one visual location of at least one of the plurality of APs.

4. The method of claim 1, further comprising:
   identifying at least one attribute within the received location information that is common to at least two APs in the plurality of APs; and
   grouping the at least two APs based on the at least one common attribute.

5. The method of claim 4, further comprising:
   performing an operation on the grouped APs.

6. The method of claim 4, further comprising:
   assigning a rank to the grouped APs based on impact on location performance;
   analyzing the rank to evaluate impact of the grouped APs on location performance; and
   declining to place the grouped APs on the floor plan map based on the rank.

7. The method of claim 1, further comprising:
   receiving information indicative of a plurality of APs; and
   utilizing the received information to determine that a first AP in the plurality of APs provides performance coverage that is redundant to at least a second AP in the plurality of APs.

8. The method of claim 7, further comprising:
   labeling the first AP as providing redundant performance coverage to at least the second AP.

9. The method of claim 8, further comprising:
   removing the first AP from being placed on the floor plan map after determining the first AP provides redundant performance coverage.

10. An apparatus configured to place access points (APs) on a floor plan map, the apparatus comprising:
    a receiver configured to receive a floor plan map and location information for a plurality of APs, wherein the floor plan map corresponds to a venue, and the plurality of APs are placed physically at the venue;
    a processor configured to:
       access a plurality of conventions associated with the plurality of APs, wherein a first one of the plurality of conventions indicates identity information for each AP of the plurality of APs and a second one of the plurality of conventions indicates the location information for each AP of the plurality of APs
       determine a first current location in the venue of a first AP of the plurality of APs based on location information for the first AP and identity information for the first AP, the identity information for the first AP based on a first convention of the plurality of conventions and the location information for the first AP based on a second convention of the plurality of conventions different from the first convention, wherein the identity information comprises at least one of signal strength, unique numerical identifier, serial number, media access control ("MAC") address, name, frequency information, MAC address prefix, chip model, vendor information, manufacturer information, model information, bandwidth information, number of ports, or number of antennas;
determine a second current location in the venue of a second AP of the plurality of APs based on location information for the second AP and identity information for the second AP, the identity information for the second AP based on the first convention and the location information for the second AP based on the second convention;
automatically place a representation of the first AP on the floor plan map at the first current location; and
automatically place a representation of the second AP on the floor plan map at the second current location.

11. The apparatus of claim 10, wherein one of the plurality of conventions comprises latitude/longitude coordinates.

12. The apparatus of claim 11, wherein one of the plurality of conventions comprises a visual map of the floor plan with a visual representation of at least one AP location.

13. The apparatus of claim 10, wherein the processor is further configured to:
identify at least one attribute within the received location information that is common to at least two APs in the plurality of APs; and
group the at least two APs based on the at least one common attribute.

14. The apparatus of claim 13, wherein the processor is further configured to:
perform an operation on the at least two APs utilizing the at least one common attribute.

15. The apparatus of claim 10, wherein the processor is further configured to:
utilize the received information to determine that the first AP in the plurality of APs provides performance coverage that is redundant to at least a second AP in the plurality of APs.

16. The apparatus of claim 15, wherein the processor is further configured to:
label the first AP as providing redundant performance coverage to at least the second AP.

17. The apparatus of claim 16, wherein the processor is further configured to:
remove the first AP from being placed on the floor plan map after determining the first AP provides redundant performance coverage.

18. An apparatus for placing access points (APs) on a floor plan map, the apparatus comprising:
means for receiving a floor plan map and location information for a plurality of APs, wherein the floor plan map corresponds to a venue, and the plurality of APs are placed physically at the venue;
means for accessing a plurality of conventions associated with the plurality of APs, wherein a first one of the plurality of conventions indicates identity information for each AP of the plurality of APs and a second one of the plurality of conventions indicates the location information for each AP of the plurality of APs;
means for determining a first current location in the venue of a first AP of the plurality of APs based on location information for the first AP and identity information for the first AP, the identity information for the first AP based on a first convention of the plurality of conventions and the location information for the first AP based on a second convention of the plurality of conventions different from the first convention, wherein the identity information comprises at least one of signal strength, unique numerical identifier, serial number, media access control ("MAC") address, name, frequency information, MAC address prefix, chip model, vendor information, manufacturer information, model information, bandwidth information, number of ports, or number of antennas;
means for determining a second current location in the venue of a second AP of the plurality of APs based on location information for the second AP and identity information for the second AP, the identity information for the second AP based on the first convention and the location information for the second AP based on the second convention;
means for automatically placing a representation of the first AP on the floor plan map at the first current location; and
means for automatically placing a representation of the second AP on the floor plan map at the second current location.

19. The apparatus of claim 18, wherein one of the plurality of conventions comprises latitude/longitude coordinates and the means for receiving the floor plan map and location information for the plurality of APs further comprises:
means for receiving a latitude/longitude coordinate of at least one of the plurality of APs.

20. The apparatus of claim 18, wherein one of the plurality of conventions comprises means for providing a visual map of the floor plan with a visual representation of an AP location, and the means for receiving the floor plan map and location information for the plurality of APs further comprises:
means for receiving a visual map comprising at least one visual location of at least one of the plurality of APs.

21. The apparatus of claim 18, further comprising:
means for identifying at least one attribute within the received location information that is common to at least two APs in the plurality of APs; and
means for grouping the at least two APs based on the at least one common attribute.

22. The apparatus of claim 21, further comprising:
means for performing an operation on the grouped APs.

23. The apparatus of claim 21, further comprising:
means for assigning a rank to the grouped APs based on impact on location performance;
means for analyzing the rank to evaluate impact of the grouped APs on location performance; and
means for declining to place the grouped APs on the floor plan map based on the rank.

24. The apparatus of claim 18, further comprising:
means for receiving information indicative of a plurality of APs; and
means for utilizing the received information to determine that a first AP in the plurality of APs provides performance coverage that is redundant to at least a second AP in the plurality of APs.

25. The apparatus of claim 24, further comprising:
means for labeling the first AP as providing redundant performance coverage to at least the second AP.

26. The apparatus of claim 25, further comprising:
means for removing the first AP from being placed on the floor plan map after determining the first AP provides redundant performance coverage.

27. A non-transitory computer program product for placing access points (APs) on a floor plan map, the computer program product residing on a processor-readable medium and comprising processor-readable instructions configured to cause a processor to:

receive a floor plan map and location information for a plurality of APs, wherein the floor plan map corresponds to a venue, and the plurality of APs are placed physically at the venue;

access a plurality of conventions associated with the plurality of APs, wherein a first one of the plurality of conventions indicates identity information for each AP of the plurality of APs and a second one of the plurality of conventions indicates the location information for each AP of the plurality of APs determine a first current location in the venue of a first AP of the plurality of APs based on location information for the first AP and identity information for the first AP, the identity information for the first AP based on a first convention of the plurality of conventions and the location information for the first AP based on a second convention of the plurality of conventions different from the first convention, wherein the identity information comprises at least one of signal strength, unique numerical identifier, serial number, media access control ("MAC") address, name, frequency information, MAC address prefix, chip model, vendor information, manufacturer information, model information, bandwidth information, number of ports, or number of antennas;

determine a second current location in the venue of a second AP of the plurality of APs based on location information for the second AP and identity information for the second AP, the identity information for the second AP based on the first convention and the location information for the second AP based on the second convention;

automatically place a representation of the first AP on the floor plan map at the first current location; and automatically place a representation of the second AP on the floor plan map at the second current location.

28. The non-transitory computer program product of claim 27, wherein one of the plurality of conventions comprises latitude/longitude coordinates.

29. The non-transitory computer program product of claim 28, wherein one of the plurality of conventions comprises a visual map of the floor plan with a visual representation of at least one AP location.

30. The non-transitory computer program product of claim 27, wherein the instructions are further configured to cause the processor to:

identify at least one attribute within the received location information that is common to at least two APs in the plurality of APs; and group the at least two APs based on the at least one common attribute.

31. The non-transitory computer program product of claim 30, wherein the instructions are further configured to cause the processor to:

perform an operation on the at least two APs utilizing the at least one common attribute.

32. The non-transitory computer program product of claim 27, wherein the instructions are further configured to cause the processor to:

utilize the received information to determine that the first AP in the plurality of APs provides performance coverage that is redundant to at least a second AP in the plurality of APs.

33. The non-transitory computer program product of claim 32, wherein the instructions are further configured to cause the processor to:

label the first AP as providing redundant performance coverage to at least the second AP.

34. The non-transitory computer program product of claim 33, wherein the instructions are further configured to cause the processor to:

remove the first AP from being placed on the floor plan map after determining the first AP provides redundant performance coverage.

* * * * *